(12) United States Patent
Ohta et al.

(10) Patent No.: US 7,203,034 B2
(45) Date of Patent: Apr. 10, 2007

(54) USING EDDY-CURRENTS FOR RELEASING ACTUATOR SUSPENSION ASSEMBLY OF ROTARY DISK STORAGE DEVICE

(75) Inventors: Mutsuro Ohta, Kanagawa (JP); Takeshi Chawanya, Kanagawa (JP); Satoshi Hayakawa, Kanagawa (JP)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 412 days.

(21) Appl. No.: 10/810,278

(22) Filed: Mar. 26, 2004

(65) Prior Publication Data
US 2005/0117258 A1 Jun. 2, 2005

(30) Foreign Application Priority Data
Mar. 28, 2003 (JP) ............................. 2003-091546

(51) Int. Cl.
*G11B 5/54* (2006.01)
(52) U.S. Cl. .................................. 360/256.2; 360/256.3
(58) Field of Classification Search ............ 360/256.2, 360/256.3
See application file for complete search history.

(56) References Cited

U.S. PATENT DOCUMENTS 5,145,038 A * 9/1992 Kuwahara .................. 188/158

6,462,913 B1 10/2002 Chew

FOREIGN PATENT DOCUMENTS

| JP | 08-339645 A | 12/1996 |
| JP | 11-110933 A | 4/1999 |

* cited by examiner

*Primary Examiner*—Jefferson Evans
(74) *Attorney, Agent, or Firm*—Townsend and Townsend and Crew LLP

(57) ABSTRACT

A mechanism is provided for restraining and releasing an actuator suspension assembly in a magnetic disk device which is in a retracted position. In a magnetic disk device, according to one embodiment, a magnetic disk 4a is formed of an electrically conductive material and there is disposed a latch member 50 which holds an eddy-current magnet at one end thereof and is provided with a latching portion at an opposite end thereof. An actuator suspension assembly 8 lies in a retracted position and is restrained at a frame engaging portion 23 thereof by means of the latch member. The eddy current magnet is disposed in such a manner that a magnetic pole thereof is opposed to a surface of the magnetic disk at a position close to the disk surface. When the magnetic disk is rotated, an eddy-current is generated and a force is exerted on the eddy-current magnet, so that the latch member turns and releases the actuator suspension assembly.

20 Claims, 11 Drawing Sheets

FIG.1
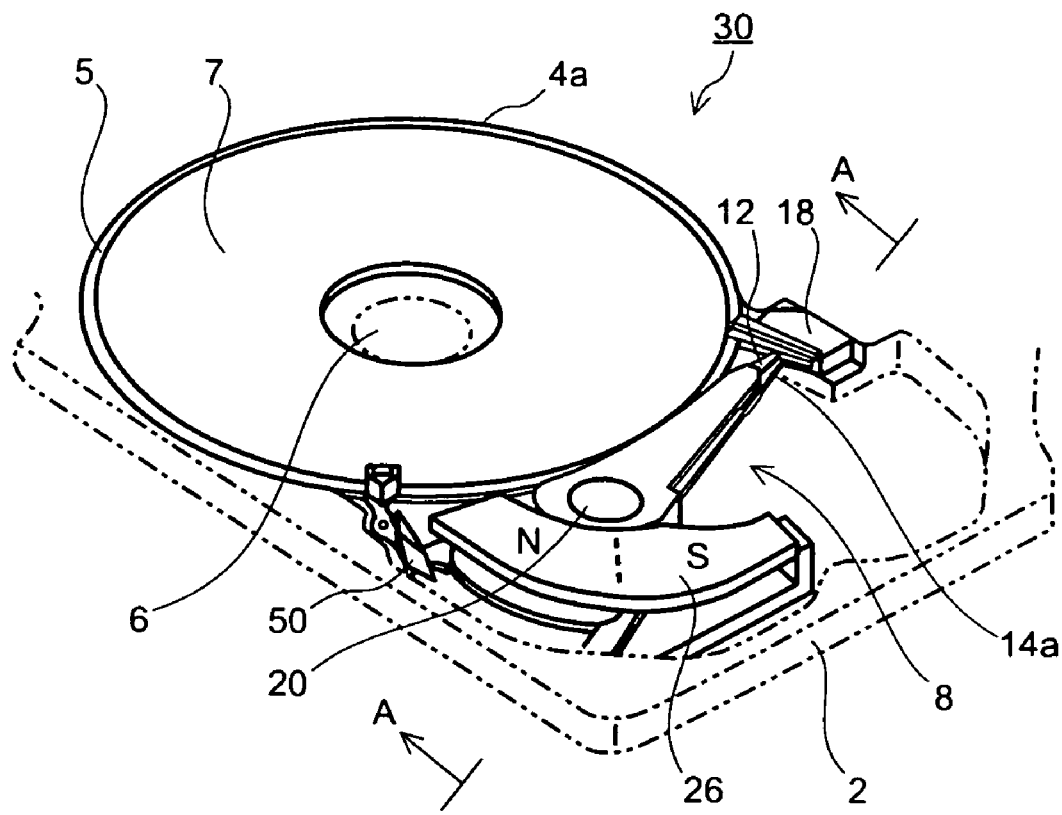
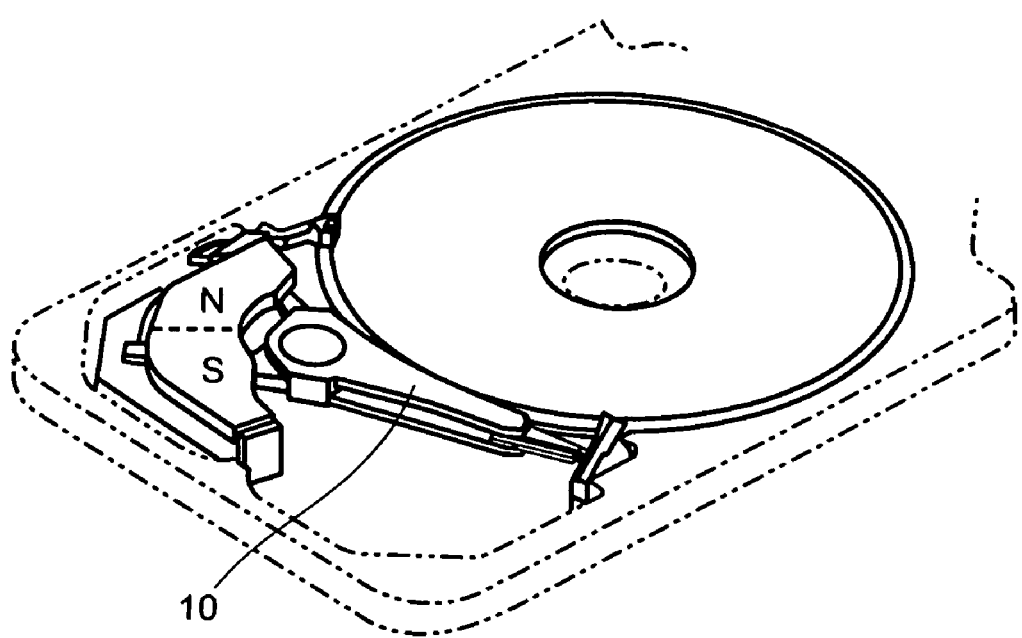

FIG.6
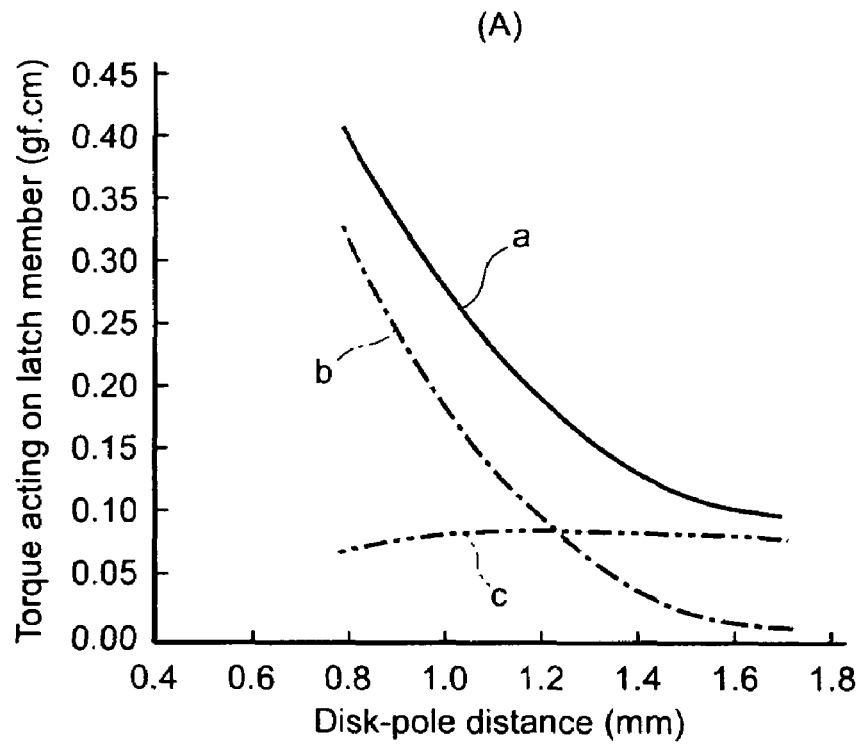
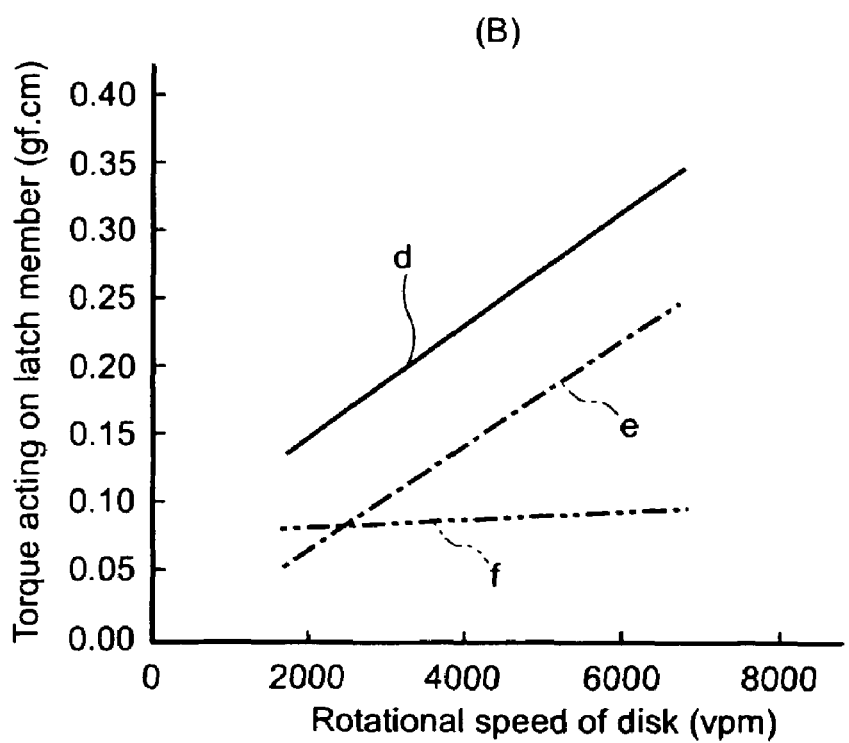

USING EDDY-CURRENTS FOR RELEASING ACTUATOR SUSPENSION ASSEMBLY OF ROTARY DISK STORAGE DEVICE

BACKGROUND OF THE INVENTION

The present invention relates to technologies of restraining the operation of an actuator suspension assembly when a rotary disk storage device such as a magnetic disk device or an optical magnetic disk device is in non-operation and a head/slider is at a predetermined retracted position, and releasing the actuator suspension assembly from the restrained state when the storage device is in operation. More specifically, the invention relates to a technologies of restraining and releasing the operation of an actuator suspension assembly securely with use of a simple mechanism within a small space defined inside a rotary disk storage device.

A magnetic disk device includes a rotary magnetic disk having a magnetic layer formed on a surface thereof and adapted to rotate about a spindle shaft, an actuator suspension assembly, and a control unit for controlling read and write of data and for controlling the operation of the actuator suspension assembly. The actuator suspension assembly includes a head for read and write of data, a slider with the head attached thereto and for providing an air bearing surface (ABS), a suspension assembly with the slider attached thereto, and a carriage arm to which the suspension assembly is connected and which is adapted to turn about a pivot shaft.

A coil arm is formed in part of the carriage arm to hold a voice coil. The coil arm is disposed within a magnetic field of a voice coil magnet. The voice coil magnet and the voice coil constitute a voice coil motor (VCM) which generates a driving force for turning the carriage arm.

With rotation of the magnetic disk, an air current on the surface forms an air bearing and a lift force is imparted to an air bearing surface of the slider, so that the slider is lifted slightly from the surface of the magnetic disk. With the driving force of the voice coil motor, the slider turns about the pivot shaft substantially radially of the magnetic disk while floating slightly from the surface of the magnetic disk, thereby permitting the head to read or write data from or to a predetermined position on the disk surface.

There is a recent tendency that a magnetic disk device is mounted on a portable information device such as a portable computer. Thus, both the reduction of size and the improvement of impact resistance are required. When the magnetic disk device is at rest, the magnetic disk does not rotate, so that the air bearing vanishes. In a load/unload type magnetic disk device, while the rotation of a magnetic disk comes to a halt, a slider is retracted to a retraction mechanism called ramp which is provided outside the magnetic disk. The ramp is described, for example, in Japanese Patent Laid-open No. 11-110933.

With the slider retracted to the ramp, if an impact force is applied to the magnetic disk device from the exterior, causing the slider to move to a recording area of the magnetic disk and come into contact with the disk surface, either the slider or the magnetic disk may be damaged. It is necessary to eliminate such damage.

If the slider lands on the surface of the magnetic disk which is at rest, there arises a sticking phenomenon called stiction between the air bearing surface of the slider and the magnetic disk surface. In the state of stiction, if an attempt is made to rotate the magnetic disk, the magnetic disk surface may be damaged or in the worst case it may become impossible to start up the magnetic disk.

In the magnetic disk device, therefore, it is necessary to use a mechanism which, after the slider has been moved to its retracted position, restrains the slider firmly at the retracted position until re-rotation of the magnetic disk even if a large impact force is applied to the magnetic disk device. Further, it is necessary that the restraint be released immediately for re-start-up of the magnetic disk, thereby allowing the actuator suspension assembly to operate freely.

Examples of methods for restraining the actuator suspension assembly while the slider is in its retracted position include magnet type, electromagnetic solenoid type, and inertial latch type methods that are described in Japanese Patent Laid-open No. 8-339645. According to the magnet type method, it is necessary that, after a carriage arm of the actuator suspension assembly is once attracted by a magnet, the actuator be operated for unlocking. A limit is encountered in the magnitude of attractive force. Besides, to obtain a large magnetic field intensity, it is necessary to ensure a large space for a large magnet. Thus, with the magnet alone, it has so far been difficult to cope with a large impact force. See Japanese Patent Laid-open No. 8-339645.

The electromagnetic solenoid type is disadvantageous in that the structure becomes complicated. Further, since the inertial latch has a play in operation, sound is generated during carriage, resulting in a user feeling as if an inside component had fallen off. Examples of other methods include a technique which utilizes an eddy current disclosed in U.S. Pat. No. 6,462,913.

According to the technique disclosed in the above U.S. patent, a rotary disk provided with a hook and magnet for locking an actuator is attached to a base of a housing rotatably, and when the rotation of a spindle is at rest, the rotary disk is placed in a hook position by virtue of a magnetic action induced by the magnet and a magnetic material formed on the back side of a hub, while when the spindle is rotating, the rotary disk is rotated with a force of an eddy current exerted on the magnet which eddy current is developed in the hub, to unlock the actuator.

BRIEF SUMMARY OF THE INVENTION

It is a feature of the present invention to provide a rotary disk storage device wherein an actuator suspension assembly restrained at a retracted position is released when a magnetic disk device is to be started up, thereby improving the impact resistance.

It is another feature of the present invention to provide a rotary disk storage device wherein a mechanism for restraining an actuator suspension assembly at a retracted position during the halt of a magnetic disk device and for releasing the actuator suspension assembly from the restrained state when the magnetic disk device is to be started up, is ensured using a simple, space-saving structure.

A principle of the present invention resides in utilizing an eddy current generated in a rotary disk recording medium at the time of releasing the operation of an actuator suspension assembly whose operation is restrained in a retracted state of a head/slider in a rotary disk storage device. It is known that if the recording medium is formed of an electrically conductive material and an eddy-current magnet is disposed close to the recording medium so that a magnetic pole of the eddy-current magnet is opposed to a surface of the recording medium, and if the recording medium is rotated in this state, a magnetic flux generated from the magnetic pole penetrates the recording medium and an eddy current flows through the recording medium by electromagnetic induction, and further, a force acts in the same direction as the rotational direction on a face of the eddy-current magnet parallel to the surface of the recording medium and a force also acts in a direction perpendicular to the surface of the recording medium.

When the operation of the rotary disk storage device is to be stopped and while the number of revolutions of the rotary disk recording medium is zero or not larger than a predetermined value, it is necessary to restrain the operation of the actuator suspension assembly so as to prevent movement of the head/slider from the retracted position, and thereby improve the impact resistance. Further, when the recording medium is to be rotated for re-start-up of the device, the actuator suspension assembly has to be brought in a state which permits its free operation.

The force which the eddy current imparts to the eddy-current magnet is related to the rotational speed of the recording medium. In this connection, the period in which the actuator suspension assembly must be restrained is coincident with the period in which the force imparted to the eddy-current magnet by the eddy current is weak or not present at all, while the period in which the actuator suspension assembly must be released coincides with the period in which the rotational speed of the recording medium is increased to a value not lower than a predetermined value. If this fact is utilized, the timing at which the actuator suspension assembly should be released can be obtained as a magnitude of force acting on the eddy-current magnet.

In the case where the rotary disk type recording medium is a magnetic disc, a study has heretofore not been made to a thorough extent about generating a magnetic field on a surface of the magnetic disc by an eddy-current magnet for example because it may cause a damage to stored data. Paying attention to the fact that a coercive force of a magnetic layer formed on a surface of a magnetic disk has recently become higher and that the magnetic disk has a higher peripheral speed with radial separation from a spindle and even an eddy-current magnet of a relatively small magnetic charge can afford a sufficient force for actuating a release mechanism, a feature of the present invention has been realized, taking also into account the knowledge that even if an eddy current is generated in a magnetic disk by means of a magnet, there is no influence on stored data.

In a first aspect of the present invention there is provided a rotary disk storage device comprising a housing, a rotary disk recording medium having a recording area, at least a partial area of the recording medium being formed of an electrically conductive material, an actuator suspension assembly to which a head/slider is attached and which includes a voice coil motor, the actuator suspension assembly being adapted to operate in such a manner that the head/slider moves between a retracted position and the recording area centrally about a pivot shaft supported by the housing, an eddy-current magnet disposed in proximity to a surface of the area of the rotary disk recording medium which area is formed of the electrically conductive material, the eddy-current magnet having a magnetic pole opposed to a surface of the rotary disk recording medium, and a movable structure which releases the actuator suspension assembly restrained in the retracted position, the release being carried out by utilizing a force of an eddy current exerted on the eddy-current magnet which eddy current is produced in the rotary disk recording medium by the magnetic pole.

According to the rotary disk storage device in the above first aspect, the actuator suspension assembly restrained in its retracted position by a known mechanism can be released from the restrained state by the movable structure with use of the eddy current force developed in the recording medium when the storage device is to be operated.

The restraint of the actuator suspension assembly means that the operation of the actuator suspension assembly is temporarily restrained forcibly so as not to be moved with an impact force or the like during retraction of the head/slider. To make the restraint, any electrical or mechanical mechanism may be interposed between the actuator suspension assembly and the housing.

Since the eddy-current magnet is disposed in proximity to the recording medium and its magnetic pole is opposed to the surface of the recording medium, a magnetic flux emitted from the magnetic pole penetrates the recording medium and an eddy current is generated with rotation of the recording medium, imparting horizontal and vertical forces to the eddy-current magnet. In the present invention, it is not always necessary that the eddy current magnet be spaced away from the recording medium. Both may be in contact with each other to such an extent as does not obstruct the rotation of the recording medium.

The forces could conceivably be used in a variety of methods. An arm with an eddy-current magnet attached to one end thereof may be disposed so as to be rotatable horizontally or vertically about a shaft and may be utilized as rotation, or an eddy-current magnet may be attached to the tip of a cantilever beam for utilization as displacement of the beam.

Further, there may be adopted a method wherein an eddy-current magnet is supported on a slidable guide and the operation of the magnet itself is used when the magnet is allowed to slide in parallel with or perpendicularly to the recording medium. In this first aspect of the invention, when the device is to be started up, the movable structure utilizes the forces in question and can thereby release the actuator suspension assembly which is restrained by various mechanisms.

This first aspect of the invention is applicable to a rotary disk storage device of a load/unload type which utilizes a ramp for the retraction of the actuator suspension assembly or of a contact start/stop type which utilizes a landing area of the recording medium.

In this first aspect of the invention, a latch member capable of turning between a restraint range and a release range can be provided as the movable structure. A force acting on the eddy-current magnet held by the latch member is taken out as rotation of the latch member, and thus a release mechanism with a simple structure can be realized. The restraint range means a turning range of the latch member wherein the latch member can restrain the actuator suspension assembly directly or indirectly through another member, while the release range means a turning range of the latch member wherein the latch member can release the actuator suspension assembly from the directly restrained state or the indirectly restrained state through another member.

Turning between the restraint range and the release range means that there may be included a range incapable of being defined to which of the two ranges it belongs due to a hysteresis characteristic present between the restraint range and the release range. The restraint range and the release range need not always mean that the latch turns in a certain range while maintaining one of the states, but may each be a range which indicates a certain specific restraint position or release position.

In this first aspect of the invention there may be provided a biasing structure which, when the rotary disk recording medium is rotating at a predetermined number of revolutions or less or is at a standstill, imparts a biasing force to the latch member to turn the latch member to the restraint range. The period in which the recording medium is rotating at a predetermined number of revolutions or less or is at a standstill corresponds to a period in which the device is not used and hence corresponds to a period in which the head/slider is retracted and the actuator suspension assembly is restrained. By thus providing a mechanism which imparts a biasing force to the latch member, it is possible to utilize the latch member as a restraining mechanism.

In this first aspect of the invention, the biasing structure may be composed of a stator magnet of the voice coil motor and the eddy-current magnet or a magnetic portion or a magnet of the latch member. According to this construction, in the actuator suspension assembly provided with the voice coil motor, it is possible to constitute the biasing structure without the provision of any special part. The biasing structure may also be constituted by a spring. According to this construction, it is possible to constitute the biasing structure without being restricted by a correlation between the stator magnet and the latch member. By adopting such a biasing structure, the restraint and release of the actuator suspension assembly can be realized with a simple and small-sized structure.

In this first aspect of the invention, moreover, the latch member may have a latching portion for restraining the actuator suspension assembly. According to this construction, the latch member can be used for restraint of the actuator suspension assembly. That is, it is not necessary to provide any other member for restraint and release, and a simple and small-sized mechanism can be realized.

Further, this first aspect of the invention may adopt a construction wherein, when the latch member turns between the restraint range and the release range, the eddy-current magnet moves in parallel with or substantially perpendicularly to the surface of the rotary disk recording medium. According to this construction, with the latch member positioned in the restraint range, the actuator suspension assembly is retrained by the latching portion of the latch member and the latch member is turned by utilizing the force acting on the eddy-current magnet, whereby the actuator suspension assembly can be released.

Further, in this first aspect of the invention there may be adopted a construction in which the rotary disk recording medium has a non-recording area and, while the latch member turns between the restraint range and the release range, the magnetic pole face of the eddy-current magnet is substantially opposed to a surface of the non-recording area. According to this construction, it is not necessary to take into account the influence of the magnetic field of the eddy-current magnet on the data stored in the recording medium, so it is possible to select arbitrarily a suitable intensity of the magnetic field of the eddy-current magnet and a suitable coercive force of the magnetic layer of the recording medium.

Further, in this first aspect of the invention, by disposing the non-recording area in the vicinity of an outer circumference of the recording medium, it is possible to reduce the size of the latch member when the latch member is disposed near an outer periphery of the recording medium, and since this place is the highest in peripheral speed of the recording medium, it is convenient for generating a large eddy current and thereby obtaining large torque.

In a second aspect of the present invention there is provided a rotary disk storage device comprising a mechanism for accommodating components of the rotary disk storage device, a medium for storing data, the data storing medium being supported rotatably by the components' accommodating mechanism and having a recording area, at least a partial area of the data storing medium being formed of an electrically conductive material, a medium for moving a head/slider between a retracted position and the recording area, the head/slider reading out data from the data storing medium, a mechanism for restraining the head/slider moving mechanism at the retracted position, a mechanism for supplying a magnetic flux to a surface of the data storing medium, the magnetic flux supply mechanism being disposed in proximity to the surface of the area of the data storing medium which area is formed of the electrically conductive material, and a mechanism for releasing the head/slider moving mechanism from the restrained state by utilizing a force of an eddy current exerted on the magnetic flux supply mechanism which eddy current is produced in the data storing medium by the magnetic flux upon rotation of the data storing medium, the restraint releasing mechanism holding the magnetic flux supply mechanism.

In a third aspect of the present invention there is provided a method for releasing an actuator suspension assembly restrained at a retracted position in a rotary disk storage device, the rotary disk storage device having a rotary disk recording medium which includes at least a partial area formed of an electrically conductive material and an actuator suspension assembly which includes a head/slider, the method comprising rotating the rotary disk recording medium and allowing an eddy current to be produced in the rotary disk recording medium by a magnetic pole of an eddy-current magnet, the eddy-current magnet being disposed at a position close to the rotary disk recording medium in such a manner that the magnetic pole is opposed to a surface of the area formed of the electrically conductive material; imparting a force based on the eddy current to the eddy-current magnet; and releasing the actuator suspension assembly from the restrained state by utilizing the force imparted to the eddy-current magnet.

BRIEF DESCRIPTION OF THE DRAWINGS

FIG. 1 is a perspective view showing a schematic construction of a magnetic disk device according to a first embodiment of the present invention.

FIG. 6 illustrates experimental data of torque acting on the latch member according to the embodiment shown in FIG. 1.

DETAILED DESCRIPTION OF THE INVENTION

Figure 2:
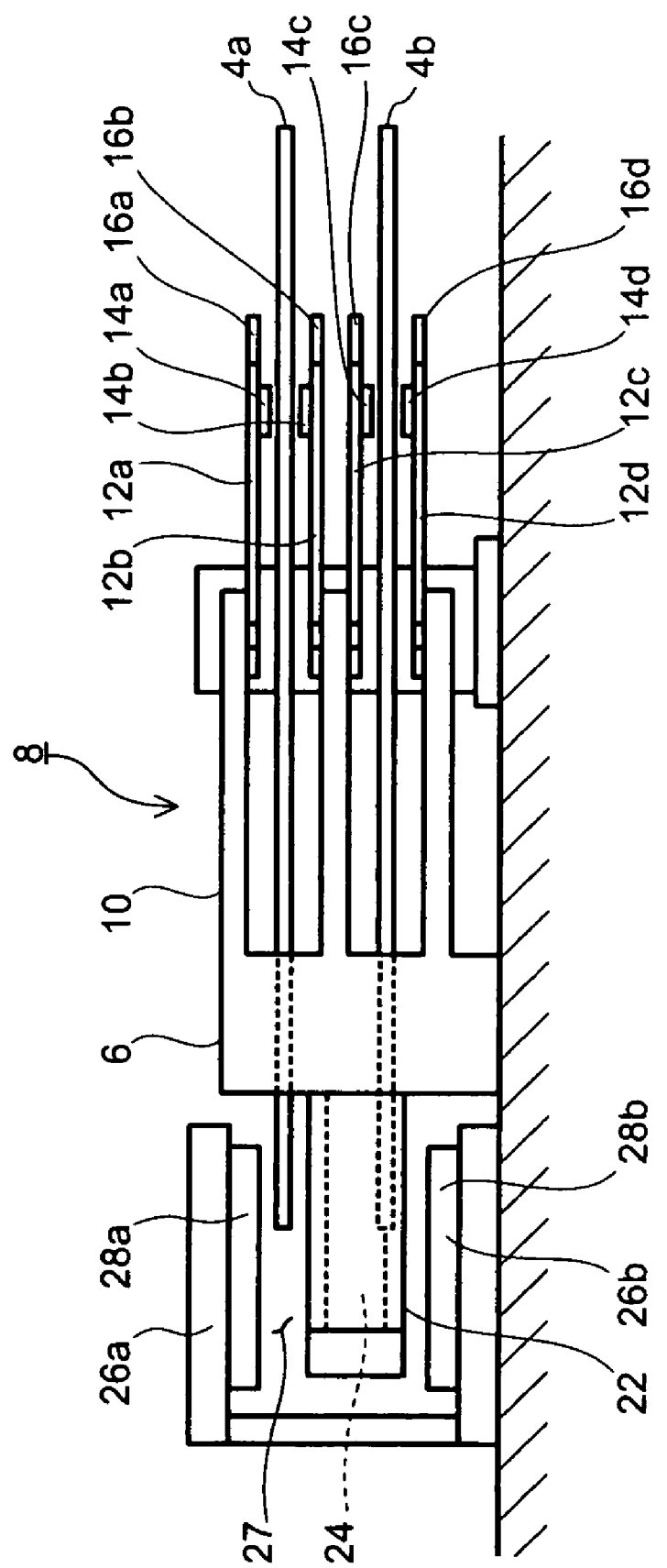
FIG. 2 is a schematic sectional view taken on line A—A in FIG. 1.

Embodiments of the present invention will be described below with reference to the accompanying drawings. FIG. 1 is a perspective view as seen in two directions, showing a schematic construction of a magnetic disk device 30 according to a first embodiment of the present invention, and FIG. 2 is a schematic sectional view taken on line A—A in FIG. 1, showing a principal portion of the magnetic disk device. In FIG. 2, for the simplification of explanation, a ramp 18 shown in FIG. 1 is omitted. In the magnetic disk device 30, two magnetic disks 4a and 4b as rotary disk type recording media, as well as an actuator suspension assembly 8, are accommodated within a clean, hermetically sealed space defined by a housing 2 and a housing lid (not shown) which covers an upper portion of the housing. Further, a logic card (not shown) for controlling the operation of the magnetic disk device 30 and for controlling the read and write of data is attached to the outside of a bottom of the housing 2.

A magnetic layer for holding data as a change of magnetic domain is formed on an aluminum substrate of each of the magnetic disks 4a and 4b by a sputtering process together with various layers which are for the improvement of adhesion and magnetic characteristics and for surface protection. The magnetic layer of each of the magnetic disks used in this embodiment has a coercive force of 3750 oersted (Oe). The data stored in the magnetic layer is less susceptible to an external magnetic field as the coercive force of the magnetic layer is greater.

The coercive force of each of the magnetic disks used in this embodiment is set to a value of such a magnitude as not to cause an error of stored data under the influence of a magnetic field created by a nearby magnet. However, as will be described later, this embodiment also provides a construction wherein stored data are not influenced even if the coercive force is small.

It is important for each of the magnetic disks used in this embodiment to have a moderate electrical conductivity so that the constituent materials of the magnetic disk permit an effective flow of eddy current under an electromagnetic induction of a magnet. In this embodiment, the aluminum substrate fulfills that function. In this embodiment it is not always necessary for the substrate itself to be electrically conductive. There also may be adopted a non-conductive substrate insofar as a conductive layer which substantially serves as an eddy current path can be formed by any of the other layers. The material of the substrate is not limited to aluminum, but may be, for example, an alloy of aluminum and magnesium, or other metals.

Further, in each of the magnetic disks, it is not necessary for the substrate or the other layers to be electrically conductive throughout the whole of the disk area. At least a partial eddy current flowing area need only be electrically conductive. Such a magnetic disk can be fabricated by a known vapor deposition technique such as the sputtering process.

In this embodiment, the two magnetic disks 4a and 4b are disposed to be spaced from one another vertically in parallel and are integrally rotated about a spindle shaft 6 by means of a spindle motor (not shown). Each of the magnetic disks is provided on each of a surface and a back side thereof with a central, recording area 7 for the storage of data which recording area occupies the greater part of the surface or the back side and an annular, non-recording area 5 located along an outer periphery of the recording area which non-recording area is not used for the storage of data.

The actuator suspension assembly 8 includes a carriage arm 10 which is pivotable about a pivot shaft 20 supported upright from the bottom of the housing 2, suspension assemblies 12a, 12b, 12c, 12d which are mounted to a tip of the carriage arm 10, and head/sliders 14a, 14b, 14c, 14d which are respectively mounted to the respective tips of the suspension assemblies.

In FIG. 2 there are provided four suspension assemblies and four head/sliders corresponding to the surfaces and back sides of the magnetic disks 4a and 4b. The head/sliders are each composed of a head which makes two-way conversion of both electric and magnetic signals and which reads and writes data between it and the associated magnetic disk and a slider with the head attached thereto. Each head/slider may be constituted by only a read head which reads a stored magnetic signal and converts it into an electric signal to reproduce information without writing data to the recording area 7 of the associated magnetic disk.

An air bearing surface (ABS) is formed at a bottom of each slider. An air current is created on a face of each rotating magnetic disk and strikes against the air bearing surface of the slider, whereby the head/slider is given a lift force. With this lift force, the head/slider flies while maintaining a slight gap from the magnetic disk face and is brought into a predetermined position. Usually, therefore, during rotation of the magnetic disk, the head/slider does not contact the magnetic disk even if it is placed above a face of the magnetic disk.

Tips of the suspension assemblies 12a, 12b, 12c, and 12d are projected to form tabs 16a, 16b, 16c, and 16d, respectively. A ramp 18 (not shown in FIG. 2) is attached to the housing 2 at a position outside the magnetic disks. The ramp is a component adopted in the load/unload method which is for providing a retraction place for the head/sliders when the operation of the magnetic disk device 30 is stopped. It is disclosed, for example, in Japanese Patent Laid-open No. 10-302421.

When the operation of the magnetic disk device 30 is to be stopped, the actuator suspension assembly 8 is moved to outside the magnetic disks before stopping the rotation of the magnetic disks, and the head/sliders are retracted to a retracted position in the ramp while allowing the tabs to be in sliding contact with the ramp. When the actuator suspension assembly pivots to a predetermined position and arrives at the retracted position in the ramp, the four head/sliders are held so as to be mutually spaced by a predetermined distance. That is, even if such an impact force as that which accelerates the head/sliders vertically is applied to the magnetic disk device, the head/sliders are kept out of contact with one another.

However, the ramp is for temporary retraction of the head/sliders. When the magnetic disk device is to be re-started up, the actuator suspension assembly can pivot to a side of the recording area 7 of the magnetic disks. Therefore, if the head/sliders are merely retracted without being restrained by any restraining mechanism, the head/slider may drop to the recording areas of the magnetic disks under the action of an impact force.

When a magnetic disk is started up by a normal operation, the magnetic disk is rotated first and thereafter the actuator suspension assembly 8 is turned toward the magnetic disk, with the result that the tab leaves the ramp while sliding on a slide surface of the ramp. Next, a head/slider moves to the surface of the magnetic disk and flies by utilizing an air bearing formed by the entry of an air current between the magnetic disk and the slider, the air current being produced with rotation of the magnetic disk.

A coil frame 22 is formed integrally with a rear portion of the carriage arm 10 and holds a voice coil 24. In the rear portion of the carriage arm 10, yokes 26a and 26b are supported from the bottom of the housing 2 so as to face each other, and voice coil magnets 28a and 28b each constituted by a permanent magnet are attached to inside faces of the yokes 26a and 26b, respectively, to define a magnetic space 27. An electric current for pivoting the actuator suspension assembly flows in the voice coil 24 held by the coil frame 22. The magnitude and direction of the electric current flowing in the voice coil 24 are controlled by the logic card, whereby it is possible to drive the actuator suspension assembly and position the head/sliders at a predetermined position.

The coil frame 22, voice coil 24, voice coil magnets 28a, 28b, and yokes 26a, 26b constitute a voice coil motor and further constitute part of the actuator suspension assembly. Assume herein that the expression "actuator suspension assembly" mainly indicates a movable portion.

In FIG. 1, when the voice coil magnets are seen from above in plan view, the upper voice coil magnet 28a (see FIG. 2) attached to the underside of the yoke 26a has an N-pole on its left-hand side and an S-pole on its right-hand side, while the lower voice coil magnet 28b opposed to the upper voice coil magnet has left and right magnetic poles which are respectively opposite in polarity to the magnetic poles of the voice coil magnet 28a. That is, the voice coil magnets 28a and 28b are arranged so that, when an electric current is allowed to pass through the voice coil 24, a magnetic field created by the voice coil magnets can impart an effective force to the voice coil through the yokes 26a and 26b.

Figure 3:
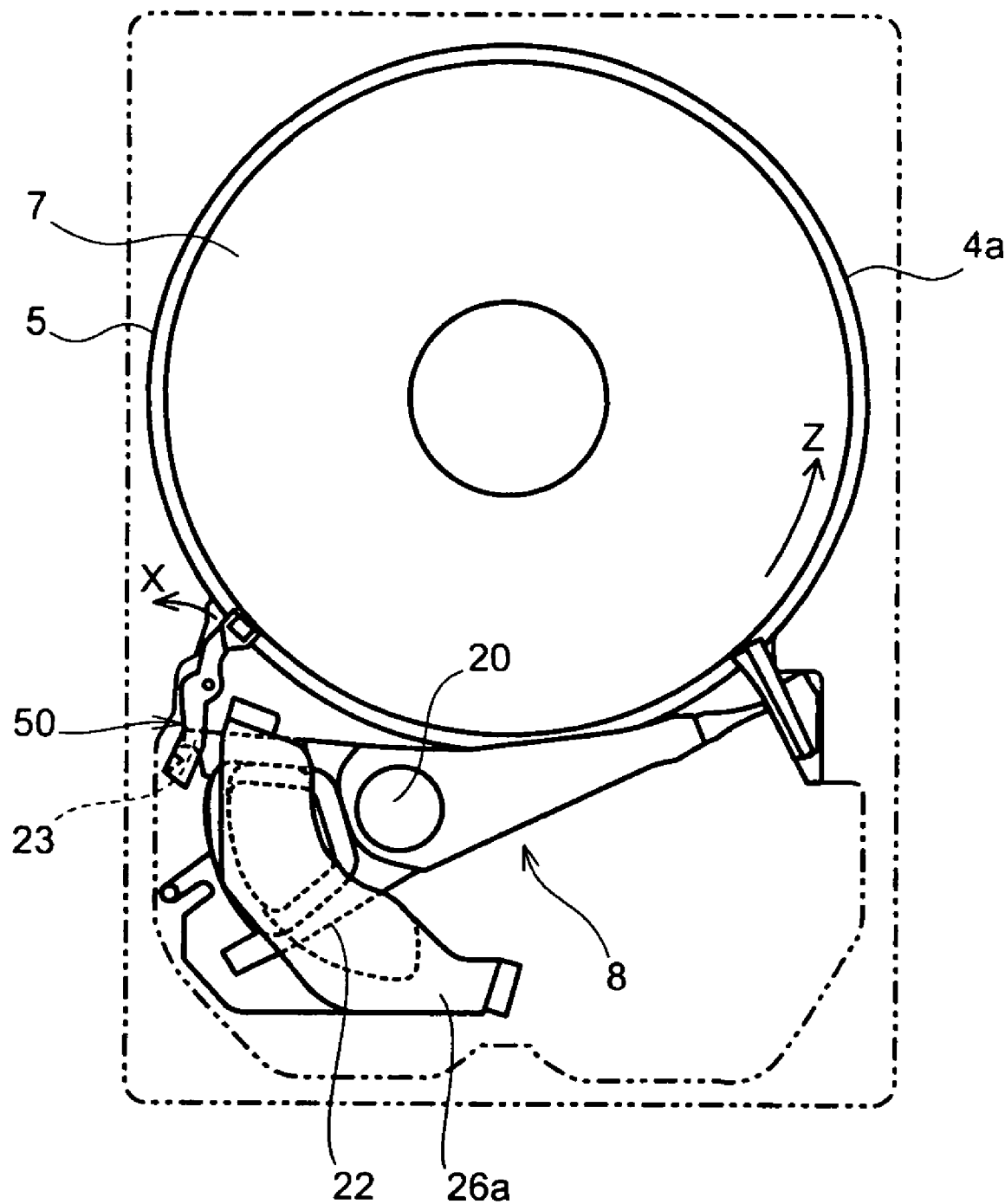
FIG. 3 illustrates a schematic construction of a latch member and an actuator suspension assembly according to the embodiment shown in FIG. 1.
Figure 4:
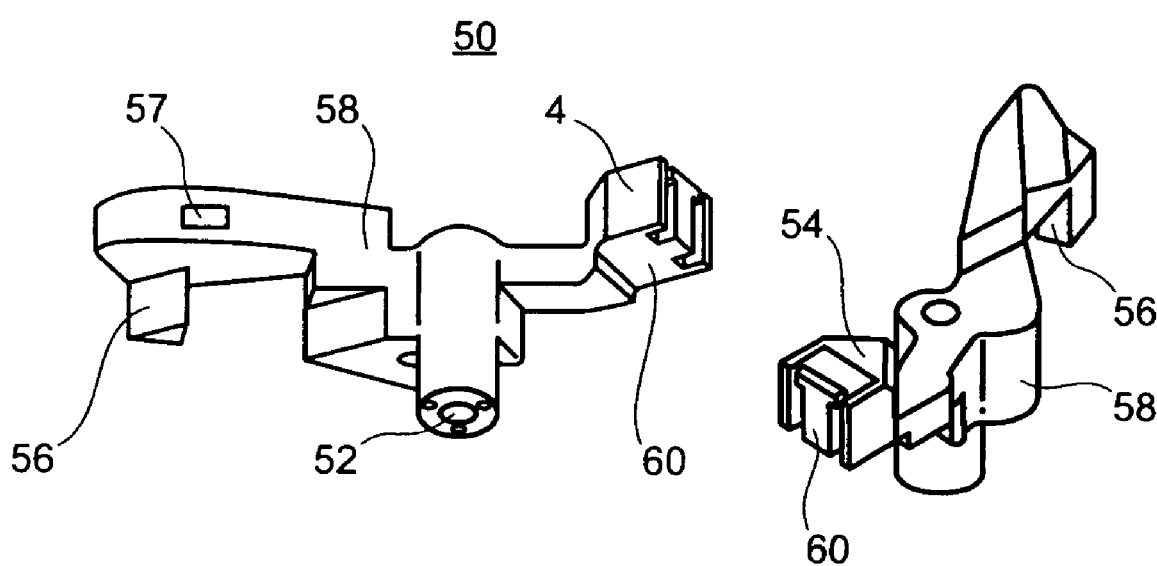
FIG. 4 illustrates a contour of the latch member according to the embodiment shown in FIG. 1.

In FIG. 1 there is further illustrated a latch member 50 for restraining the actuator suspension assembly located at the retracted position. FIG. 3 shows a state in which the actuator suspension assembly 8 located at the retracted position is restrained by the latch member 50. FIG. 4 illustrates contours of the latch member as seen from both an obliquely downward angle and an obliquely upward angle.

As shown in FIG. 3, a frame engaging portion 23 is formed at a tip of the coil frame 22, and the actuator suspension assembly 8 is restrained by the latch member 50 to inhibit movement of the head/sliders toward the magnetic disk 4a.

In FIG. 4, the latch member 50 is formed of a non-magnetic material such as a plastic material, and includes a latch arm 58 provided with a central shaft hole 52, a magnet holder 54 formed at one end of the latch arm, and a latching portion 56 formed at an opposite end of the latch arm. A latch shaft 51 (see FIG. 3), which is supported upright from the bottom of the housing, is inserted through the central shaft hole 52 so that the latch member 50 can turn about the latch shaft.

An eddy-current magnet 60 is accommodated in the magnet holder 54. With the latch member 50 attached to the magnetic disk device, a lower pole face of the eddy-current magnet is positioned so as to face the surface of the magnetic disk 4a. A magnetic flux emitted from the magnetic pole of the eddy-current magnet oriented to the surface of the magnetic disk 4a penetrates the magnetic disk. The eddy-current magnet 60 may be constituted by an electromagnet, but from the standpoint of structural simplification it is preferable to use a permanent magnet.

If the eddy-current magnet is disposed above the surface of the magnetic disc 4a, there is no interference of the latch member 50 with the stacked magnetic disks 4a and 4b, which does not encounter an obstacle to assembling of the magnetic disk storage device.

Although in this embodiment the eddy-current magnet is disposed on only the upper surface side of the magnetic disk 4a, if an eddy-current magnet of an opposite polarity is disposed also on the lower surface side of the same disk to form a magnetic path, it is possible to increase the magnetic field intensity and thereby increase the force acting on the eddy-current magnet.

The magnetic pole of the eddy-current magnet is not required to be a magnet of a very high strength; so even it is disposed not only in the non-recording area 5 on the surface of the magnetic disk 4a but also at any position of the recording area 7 oppositely to the same area, it is possible to allow an effective eddy current to flow without exerting any influence on the stored data. Thus, no matter at which position the magnetic pole may be disposed, the effect thereof can be exhibited. In this embodiment, for a margin of safety, the magnetic pole is disposed so as to face the non-recording area 5 which is formed annularly near the outer periphery of the magnetic disk.

In this embodiment, the distance from the surface of the magnetic disk to the magnetic pole of the eddy-current magnet opposed thereto is set at about 0.7 mm, and a magnetic field intensity of the eddy-current magnet is selected so as to afford a magnetic flux density of about 2150 gauss (0.215 Wb/m2) on the disk surface just under the magnetic pole.

In the relation between this magnetic field intensity and the coercive force 3750 oersted, it has been confirmed that even if the eddy-current magnet is disposed above the recording area 7, there is no influence on the stored data. However, if the eddy-current magnet 60 is disposed above the non-recording area 5, it is not necessary to take into account the coercive force of the magnetic disk and the magnetic field intensity of the eddy-current magnet; besides, the non-recording area 5 is the highest in peripheral speed on the magnetic disk, so that such an arrangement is desirable for obtaining a large eddy current.

In this embodiment, the eddy-current magnet 60 is also utilized as a biasing structure while utilizing the force exerted between the eddy-current magnet 60 and the voice coil magnets 28a, 28b. The polarity of the magnetic pole of the eddy-current magnet opposed to the surface of the magnetic disk is therefore associated with the polarity of the voice coil magnets 28a, 28b. The biasing structure provides such a torque as to cause the latch member to turn to the restraint range, i.e., such torque as to cause the latch member to turn in the X direction in FIG. 3, when the actuator suspension assembly is located at the retracted position.

In this embodiment, since the eddy-current magnet side of the voice coil magnet 28a is an N-pole and that of the voice coil magnet 28b is an S-pole, an upper side of the eddy-current magnet 60 is made N-pole and the face thereof opposed to the magnetic disk is made S-pole. As a result, the eddy-current magnet 60 receives a repulsive force from the voice coil magnets and imparts a biasing force as a rotational force in the X direction to the latch member 50.

According to this construction, the actuator suspension assembly located at its retracted position can be restrained by the latching portion 56 of the latch member. When the actuator suspension assembly 8 is located at its retracted position, the latching portion 56 comes into engagement with the frame engaging portion 23 formed in part of the coil frame 22 and restrains the operation of the head/sliders so as not to move toward the magnetic disks under an external impact force for example. It is not always necessary for the frame engaging portion to be formed in part of the coil frame. It may be formed in any portion of the actuator suspension assembly.

Figure 5:
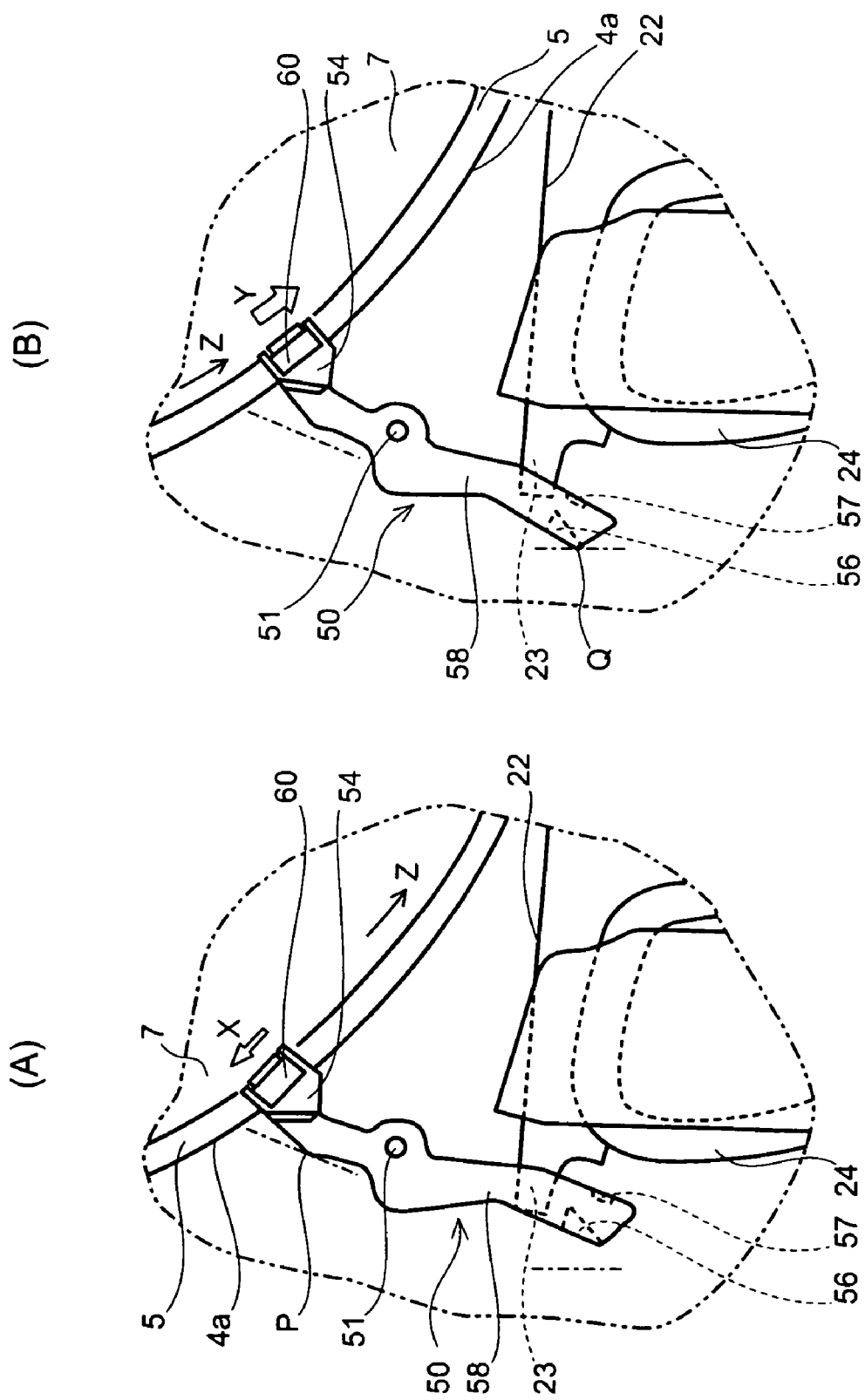
FIG. 5 illustrates a state in which the latch member according to the embodiment shown in FIG. 1 is in a restraint range and a state in which it is in a release range.

Next, with reference to FIG. 5, a description will be made below of the operation of the magnetic disk device constructed as above. FIG. 5(A) illustrates a state in which the magnetic disk device is at rest and the actuator suspension assembly is in its retracted position (see FIG. 1).

Even if an impact force that causes the head/sliders to move away from the magnetic disks is exerted on the actuator suspension assembly which is in its retracted position, the actuator suspension assembly is prevented from turning beyond its retracted position. This can be done by any known method. For example, the movement of the actuator suspension assembly may be inhibited using a delimiting stopper.

In this state, as shown in FIG. 5(A), by virtue of a repulsive force induced by the action between the voice coil magnets 28a, 28b and the eddy-current magnet 60, i.e., by virtue of a biasing force, the latch member 50 undergoes a force in the X direction and turns about the latch shaft 51 and the latch arm 58 stops in abutment against a point P of the housing.

The latch member 50 in FIG. 5(A) is in a restraint range in which the frame engaging portion 23 formed at the tip of the oil frame 22 and the latching portion 56 are engaged with each other to prevent the actuator suspension assembly from turning in a direction of causing the head/sliders to approach the magnetic disks. In this embodiment, the restraint range corresponds to a pivotal range of the latch member in which the latching portion 56 can restrain the flame engaging portion 23, and therefore this range is reached before abutment of the latch member against the point P of the housing.

Accordingly, when the actuator suspension assembly is in its retracted position and the latch member 50 is in the restraint range, even if a strong impact force is applied to the magnetic disk device from the exterior, the actuator suspension assembly is firmly fixed to the housing by means of the latch member, and the head/sliders may not move to the surfaces of the magnetic disks, may not cause damage to the disks, or may not generate stiction.

The following description is now made of what operations are performed when rotating the magnetic disk 4a or 4b for operating the magnetic disk device. When the magnetic disk device 30 is to be operated, it is necessary that the actuator suspension assembly be released from its state restrained by the latch member 50 and be able to move the head/sliders toward the magnetic disks.

In the state of FIG. 5(A), if the magnetic disk 4a is rotated in the Z direction, an induced current called eddy current flows through the magnetic disk due to a relative motion between a magnetic flux emitted from the eddy-current magnet 60 and the magnetic disk formed by an electric conductor and in accordance with Fleming's right-hand rule. Since the eddy current lies within the magnetic field of the eddy-current magnet 60, a force based on Fleming's left-hand rule acts between the magnetic disk and the eddy-current magnet. As a result, the eddy-current magnet 60 exerts a force in the same direction as the rotational direction of the magnetic disk 4a.

This force induced by the eddy current depends on the magnetic field intensity of the eddy-current magnet, the spacing between the eddy-current magnet and the magnetic disk, electrical properties of the magnetic disk, and a peripheral speed of the rotating magnetic disk. In this embodiment, the force in question is selected so as to exceed the biasing force. Therefore, the force in the Y direction acting on the latch member becomes larger as the rotational speed of the magnetic disk increases, and the latch member turns about the latch shaft 51 up to the release range as shown in FIG. 5(B), then finally the latch arm 58 comes into contact with a side wall point Q of the housing and stops. This principle is well known also as Arago's disk.

The latching portion 56 of the latch member 50 lying in the release range shown in FIG. 5(B) is no longer at its position of engagement with the frame engaging portion 23, so that the actuator suspension assembly is disengaged from the latch member and can turn so as to move the head/sliders toward the magnetic disk. In this embodiment, the release range of the latch member is reached before abutment of the latch arm 58 of the latch member against the side wall point Q of the housing.

When the magnetic disk device is brought into a halt, first the head/sliders are retracted to the ramp and the actuator suspension assembly is placed at its position shown in FIG. 5(A). While the magnetic disk is rotating, a force in the Y direction, which is larger than the biasing force in the X direction, is exerted on the latch member 50, but as the power supply for the magnetic disk is turned off and the number of revolutions of the disk decreases gradually, the biasing force in the X direction becomes larger than the force in the Y direction. Consequently, the latch member 50 turns toward the restraint range and finally comes in contact with the side wall point P of the housing and stops. At this time, the latching portion 56 engages the frame engaging portion 23 to restrain the actuator suspension assembly.

In the present embodiment, the timing at which the actuator suspension assembly is released from its restrained state can be made coincident with the timing at which the actuator suspension assembly must actually operate freely, that is, must permit rotation of the magnetic disk. Thus, the restraining/releasing mechanism is realized by a simple structure not requiring any other special mechanism.

Moreover, since the eddy-current magnet is disposed on the outer periphery of the magnetic disk which can provide a high peripheral speed, it is possible to reduce the size of the eddy-current magnet which is necessary for obtaining torque to rotate the latch member against the biasing force. Thus, the space within the housing required for the latch member according to the present embodiment may be small.

FIGS. 6(A) and 6(B) illustrate experimental data of the torque acting on the latch member described above. FIG. 6(A) shows the measurements of torques acting on the latch member when a 1.27 mm thick magnetic disk for a 3.5 type magnetic disk device was rotated at 7,200 rpm to change the distance between an eddy-current magnet and the disk surface. The eddy-current magnet used for this measurements was the one illustrated in FIG. 1. In FIG. 6(A), line (a) represents the measurement with the voice coil magnet removed and line (b) represents the measurement with the voice coil magnet attached to generate a biasing force.

Line (c) represents a difference between lines (a) and (b), corresponding to a biasing force induced by both the eddy-current magnet and the voice coil magnet. The range in which line (b) exceeds line c corresponds to a range in which there can be obtained a torque for allowing the latch member to be turned to the release range by the eddy current.

FIG. 6(B) illustrates torque acting on the latch member when the magnetic pole face of the eddy-current magnet is opposed to and spaced 0.81 mm from a 1.27 mm thick magnetic disk for a 3.5 type magnetic disk device and when the rotational speed of the disk is changed. Line (d) represents the measurement with the voice coil magnet removed and line (e) represents the measurement with the voice coil magnet attached to generate a biasing force.

Line f represents a difference between lines (d) and (e), corresponding to a biasing force induced by both the eddy-current magnet and the voice coil magnet. The range in which line (e) exceeds line (f) corresponds to a range in which there can be obtained torque for allowing the latch member to be turned to the release range by the eddy current.

In the embodiment described above with reference to FIGS. 1 to 6, a repulsive force between the eddy-current magnet 60 and the voice coil magnets 28a, 28b is used as a biasing force for positioning the latch member 50 in the restraint range. Another example for obtaining the biasing is the one in which part of the latch member is constituted by a magnetic material or a magnet and a force acting between the latch member and the voice coil magnet is utilized.

A magnetic material or a magnet is buried in the latch member formed of a plastic material at a position indicated by 57 in FIG. 4. If the latch member is disposed as in FIG. 3, it is possible to generate an attractive force between the voice coil magnets 28a, 28b and the latch member and allow the latch member to turn in the X direction. As is apparent to those skilled in the art, the magnet 57 may be buried on the magnet holder side relative to the shaft hole 52 and a repulsive force acting between the voice coil magnet and the magnet 57 may be utilized.

When only the magnetic material or the magnet 57 is utilized for the biasing force, the eddy-current magnet 60 is disposed at a position not influenced by the magnetic field of the voice coil magnets. Further, the biasing force acting between the voice coil magnets and the eddy-current magnet and the biasing force acting between the voice coil magnets and the magnetic material or the magnet 57 may be combined together.

Figure 11:
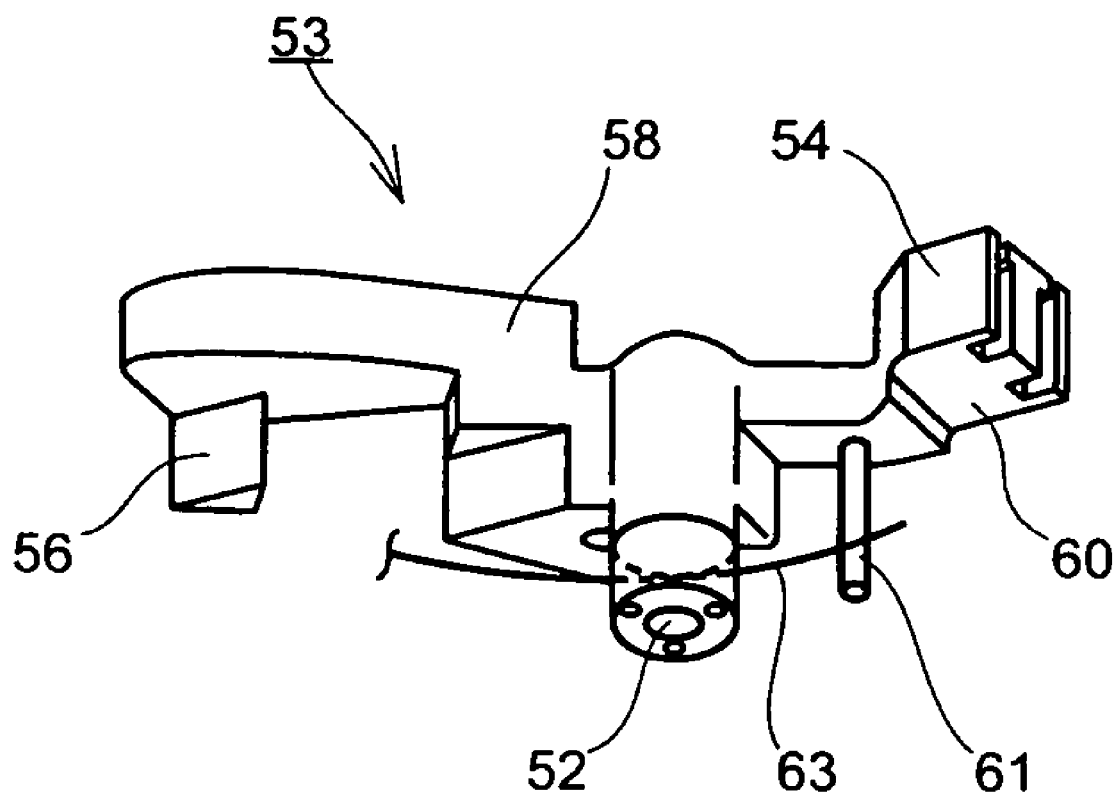
FIG. 11 illustrates an example of imparting a biasing force to a latch member.

Still another example of a method for obtaining the biasing force is the one in which a spring may be brought into engagement with a latch member and its resilient force may be utilized. FIG. 11 illustrates a construction for obtaining the biasing force with use of a spring. As compared with the latch member 50 shown in FIG. 4, a latch member 53 shown in FIG. 11 comprises a spring stopper 61, and a spring 63 engaged around a bearing which constitutes a shaft hole 52. One end of the spring 63 is in abutment against a side wall of the housing, while an opposite end thereof is in abutment against the spring stopper 61, imparting to the spring stopper a biasing force for turning the latch member in the X direction (FIG. 3).

When only the spring 63 is utilized for the biasing force, the eddy-current magnet 60 is disposed at a position at which it is not influenced by the magnetic field of the voice coil magnet. Further, the biasing force acting between the voice coil magnets and the eddy-current magnet and the biasing force induced by the spring may be combined together.

Figure 7:
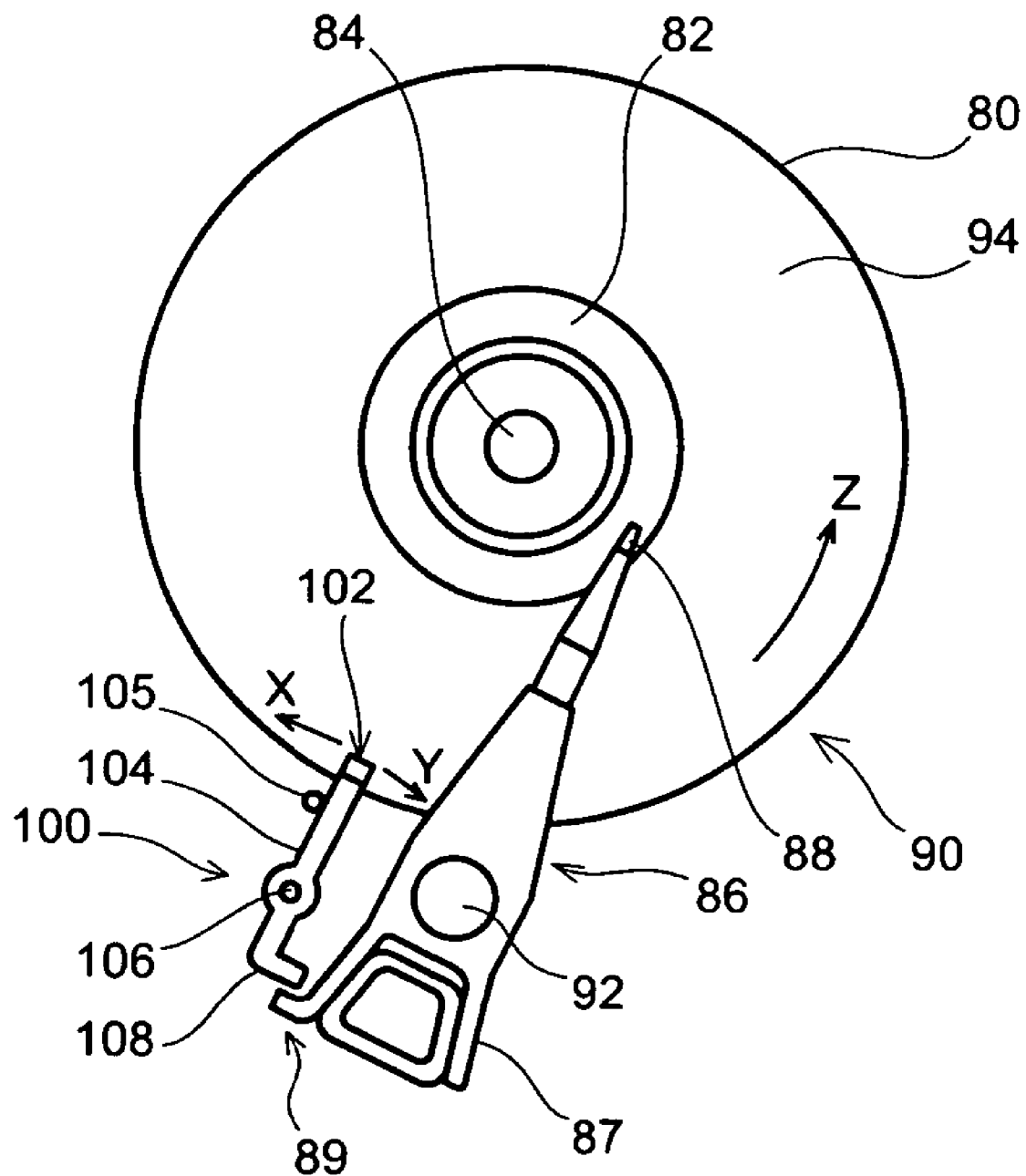
FIG. 7 illustrates a schematic construction of a magnetic disk device according to a second embodiment of the present invention.

FIG. 7 illustrates a schematic construction of a magnetic disk device 90 according to a second embodiment of the present invention. A magnetic disk 80 formed of an electrically conductive material is mounted so as to be rotatable about a spindle shaft 84. The magnetic disk 80 has a landing area 82 formed in the vicinity of its inner periphery and a recording area 94 formed outside the landing area. The landing area 82 is an area having an uneven shape called texture on a surface of the magnetic disk. The landing area functions as an area on which a head/slider 88 lands when losing the action of an air bearing upon stop of rotation of the magnetic disk or functions as an area for taking off of the head/slider upon rotation of the magnetic disk. The head/slider retracting method which utilizes the landing area is called a contact start/stop (CSS) method.

The texture of the landing area functions to diminish a frictional force and prevent wear of the magnetic disk surface when the head/slider lands on or takes off from the magnetic disk. An actuator suspension assembly 86 is constructed so as to be pivotable about a pivot shaft 92. Also while the operation of the magnetic disk device 90 is stopped and the head/slider is placed in contact with an upper surface of the landing area 82, it is necessary to prevent the head/slider from being moved to the recording area 94 with an impact force applied to the magnetic disk device 90. This is the same as in the case of the load/unload method described above in connection with FIG. 1.

In the embodiment illustrated in FIG. 7, turning of the head/slider placed in its retracted position toward the spindle shaft 84 can be prevented by a known method such as the use of a physical stopper against the actuator suspension assembly 86. In order to prevent movement of the head/slider to the recording area 94 and to enable the actuator suspension assembly to operate as necessary when starting the operation of the magnetic disk device, a latch member 100 is adopted which applies the concept of latch member described above in connection with FIGS. 3 to 5.

In the latch member 100, a latch arm 104 is provided at one end thereof with an eddy-current magnet 102 and at an opposite end thereof with a latching portion 108, and a shaft hole is formed centrally of the latch arm 104. A latch shaft 106, which is upright from the bottom of the housing, is inserted into the shaft hole, whereby the latch member 100 is supported rotatably. The latching portion 108 is constituted by a magnetic material or a magnet and is attracted with an attracting force (biasing force) of a voice coil magnet (not shown). Consequently, while the magnetic disk 80 stops its rotation, the latch member turns in X direction until abutment against a stopper 105 which is formed, for example, by utilizing the wall of the housing, and is positioned in the restraint range. A coil frame 87 is provided at one end thereof with a frame engaging portion 89.

A description will now be given of the operation of the magnetic disk device according to this embodiment whose construction is illustrated in FIG. 7. When the actuator suspension assembly 86 is located in its retracted position, the latch member 100 is placed in the restraint range by virtue of a biasing force. The actuator suspension assembly lying in the retracted position is restrained by a known method so as not to be pivotable toward the spindle shaft 84 and its pivotal motion toward the recording area 94 is restrained by a mechanism comprising the latching portion 108 of the latch member 100, the frame engaging portion 89 and the stopper 105.

If the magnetic disk 94 is rotated in the Z direction, a force in the Y direction is exerted on the eddy-current magnet 102 by virtue of an eddy current flowing in the magnetic disk 94, causing the latch member 100 to turn in the Y direction about the latch shaft 106. The force acting on the latch member is selected so as to become larger than the biasing force when the number of revolutions of the magnetic disk reaches a predetermined value or more. As the latch member 100 turns in the Y direction, it finally enters the release range, whereby the latching portion 108 and the frame engaging portion 89 are disengaged from each other and the actuator suspension assembly is released from its restrained state and becomes pivotable toward the recording area.

In the retracting motion, the head/slider is retracted to the landing area before stopping the rotation of the magnetic disk, then the power supply of the magnetic disk device is turned off, allowing the number of revolutions of the magnetic disk to decrease gradually, with the result that the biasing force in the X direction becomes larger than the force in the Y direction. Consequently, the latch member turns in the X direction and enters the restraint range, then the latching portion 108 comes into engagement with the frame engaging portion 89 to restrain the actuator suspension assembly.

Figure 8:
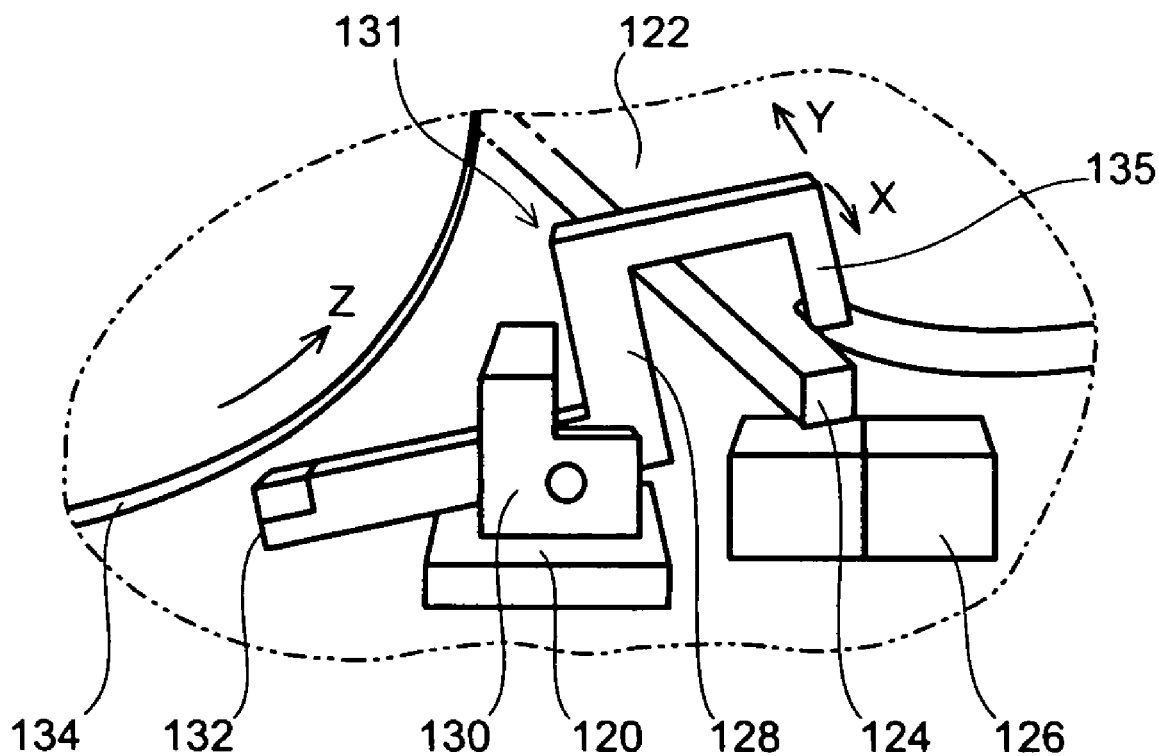
FIG. 8 illustrates a construction of a latch member further embodying the invention.

Although reference has been made above to the embodiments in which the actuator suspension assembly is released from its restrained state by utilizing a force based on an eddy current and acting on the eddy-current magnet in a direction parallel to the surface of the magnetic disk, the eddy current also generates a force acting to pull the magnetic pole of the eddy-current magnet apart from the surface of the magnetic disk vertically. FIG. 8 illustrates an embodiment relating to a restraining and releasing mechanism which utilizes such a force acting in the vertical direction.

FIG. 8 illustrates only principal portions for avoiding description overlapping the above description of embodiments according to the present invention. In FIG. 8 there are shown a magnetic disk 134 formed of an electrically conductive material, a latch member 131, and a coil frame 122 which is part of an actuator suspension assembly. A frame engaging portion 124 is provided in part of the coil frame.

In the latch member 131, an eddy-current magnet 132 is attached to one end of a latch arm 128, while a latching portion 135 formed by a magnetic material or a magnet is attached to an opposite end of the latch arm 128, and the latch member 131 is supported vertically pivotably by means of a bearing 130 fixed to a bottom 120 of the housing. Further, there is provided a biasing magnet 126 for attracting the latching portion 135 and imparting a biasing force to the latch member 131.

When the latch arm 128 turns and stops at its final position with a biasing force exerted on the latch member 131, a magnetic pole face of the eddy-current magnet 132 and a surface of the magnetic disk 134 are opposed to each other while keeping a slight gap therebetween.

A description is now directed to the operation of this embodiment constructed as above. When the actuator suspension assembly is in its retracted position and the rotation of the magnetic disk 134 stops, the latching portion 135 is attracted by the biasing magnet 126 into engagement with the frame engaging portion 124 and restrains the actuator suspension assembly.

When the magnetic disk 131 rotates in the Z direction, the magnetic flux of the eddy-current magnet 132 penetrates the magnetic disk and an eddy current is developed by electromagnetic induction, imparting a force to the eddy-current magnet which force acts in a direction (downward in FIG. 8) to pull the magnet apart from the surface of the magnetic disk. This force is selected so as to be larger than the biasing force created by both the latching portion 135 and the biasing magnet 126. With this force, the latch arm turns in the Y direction about the bearing 130 to release the restraint of the actuator suspension assembly.

An operation principle in stopping the magnetic disk is the same as that described above in the previous embodiments. First, the head/slider is retracted and then the rotation of the magnetic disk is stopped. As a result, with decrease of the force based on the eddy current, the latch member turns in the X direction with the biasing force and the latching portion 135 restrains the actuator suspension assembly.

The technique disclosed in U.S. Pat. No. 6,462,913 utilizes an eddy current developed in a hub which is formed around a spindle. The hub is disposed centrally of a magnetic disk and a rotary disk is disposed in a space defined below the magnetic disk located at the lowest stage.

Further, a peripheral speed of the surface of the hub which is rotating is lower than that of the magnetic disk and so, in order to obtain a sufficient rotational torque of the rotary disk, the size of a magnet tends to become larger.

In the previous embodiments of the present invention it is not necessary to utilize the space below the magnetic disks, but a high peripheral speed can be obtained by utilizing an outer space of a magnetic disk plane which is relatively easy to ensure. Therefore, the previous embodiments can surely cope with the demand for the downsizing and thinning of the magnetic disk devices that is increased more and more in recent years.

Figure 9:
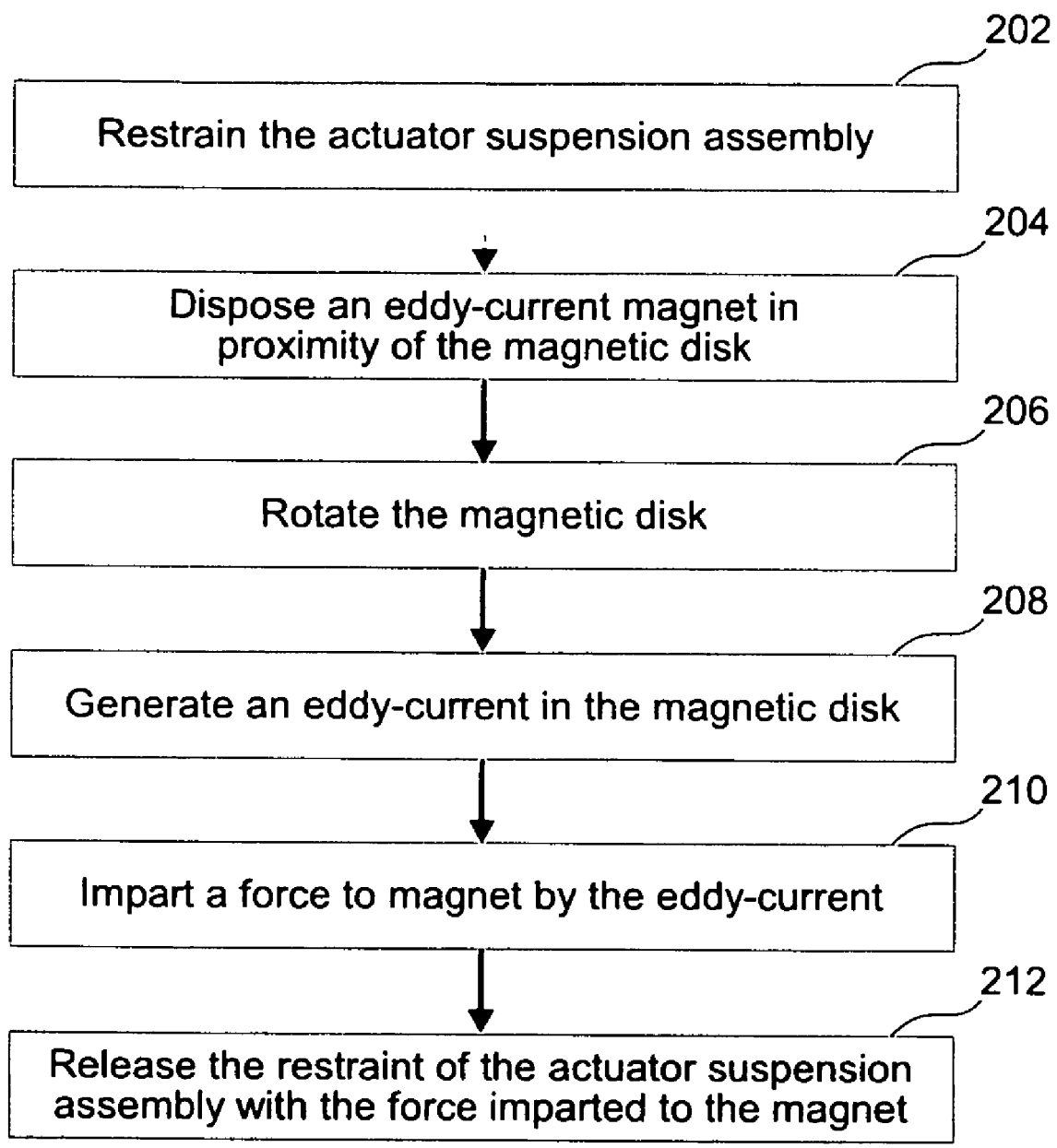
FIG. 9 is a flow chart of a method further embodying the invention for restraining and releasing an actuator suspension assembly.

Next, with reference to FIG. 9, a description will now be given of a method embodying the invention for releasing the actuator suspension assembly. In the same figure, in block 202, the actuator suspension assembly is restrained in its retracted position by a known method. The method for restraint is not specially limited insofar as the actuator suspension assembly can be released by utilizing the force acting on an eddy-current magnet. For example, there may be adopted a mechanical method or a combination of both mechanical method and electrical method.

In block 204, an eddy-current magnet is disposed in proximity to a magnetic disk in such a manner that a magnetic pole of the eddy-current magnet faces the surface of the magnetic disk. It is preferable that the magnetic pole and the magnetic disk surface be positioned as close as possible in a range in which both are not in contact with each other even in the presence of a manufacturing error or an external factor. This is because a magnetic flux emitted from the magnetic pole can be utilized effectively and it is possible to reduce the size of the eddy-current magnet. However, the scope of the present invention does not exclude the case where the magnetic pole and the magnetic disk surface are in contact with each other.

In block 206, the magnetic disk, which is formed of an electrically conductive material, is rotated. Start-up of the magnetic disk in this embodiment also has a meaning of a timing for releasing the restraint of the actuator suspension assembly simultaneously with the acquisition of a force for releasing the restraint. In block 208, an eddy current is developed in the magnetic disk by the action of electromagnetic induction induced by the eddy-current magnet.

In block 210, the eddy current exerts a force on the magnet, and in block 212, the restraint of the actuator suspension assembly is released by utilizing the force. Directions of the force imparted to the eddy-current magnet there are two directions; a rotational direction in parallel with the surface of the magnetic disk and a direction in parallel with and extending away from the disk surface. Either of the two, or a combination thereof, may be utilized.

Figure 10:
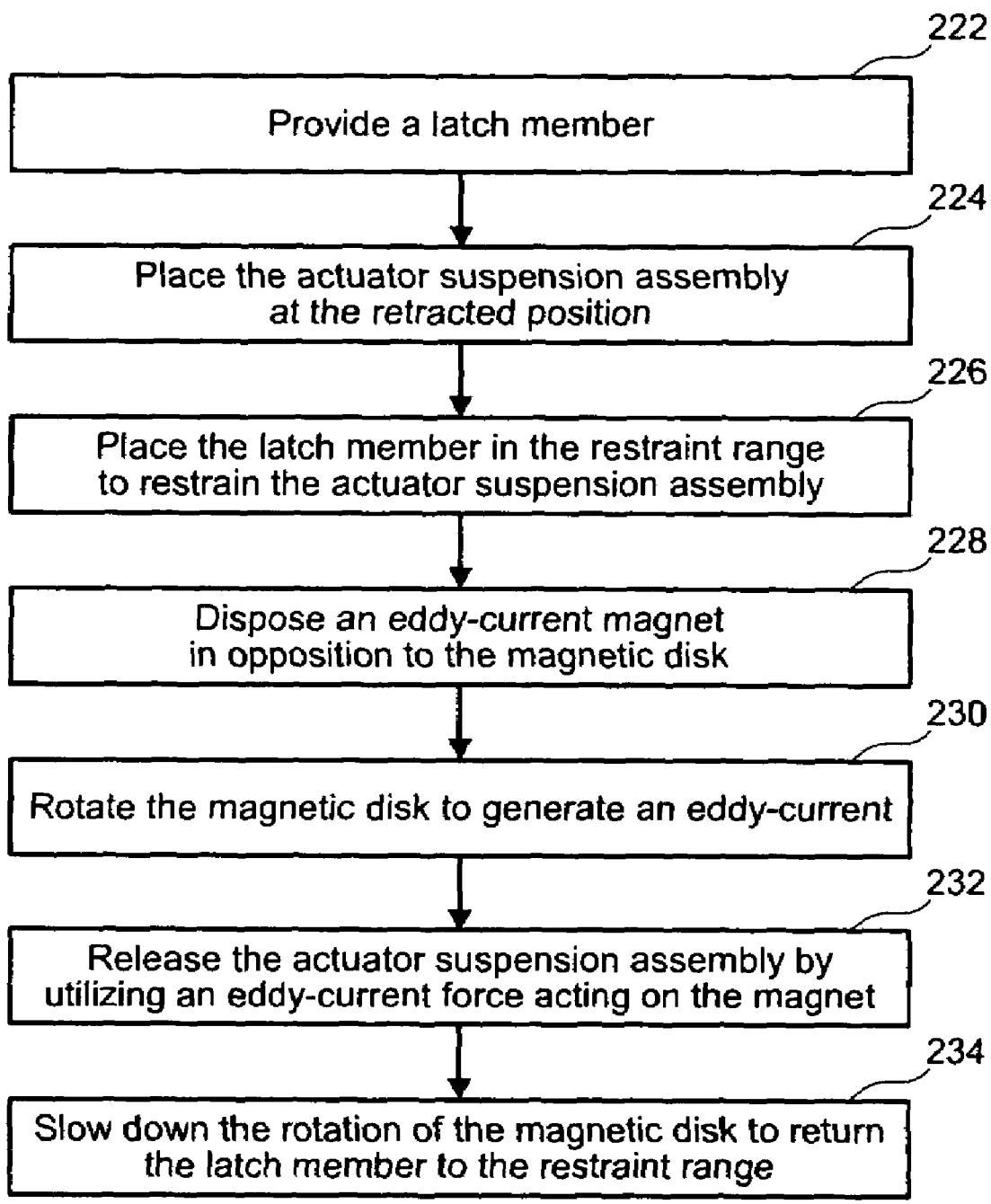
FIG. 10 is a flow chart of a method further embodying the invention for restraining and releasing an actuator suspension assembly.

Next, with reference to FIG. 10, a description will be given of a method embodying the invention for restraining and releasing the actuator suspension assembly. In block 222, there is provided a latch member for restraining and releasing the actuator suspension assembly.

In block 224, the head/slider is retracted to the ramp or the landing area and actuator suspension assembly is placed in its retracted position. In block 226, the latch member is positioned in the restraint range to restrain the actuator suspension assembly placed in the retracted position. In block 228, an eddy-current magnet is disposed at a position close to the surface of magnetic disk. In block 230, the magnetic disk is rotated and an eddy current is developed in the magnetic disk by a magnetic field of the eddy-current magnet.

In block 232, the latch member is placed in the release range by utilizing a force which the eddy current imparts to the eddy-current magnet, to release the actuator suspension assembly. In block 234, when the rotational speed of the magnetic disc is decreased for turning off the magnetic disk device, the latch member is again placed in the restraint range to permit restraint of the actuator suspension assembly.

Although the present invention has been described above by way of specific embodiments thereof illustrated in the drawings, it goes without saying that the present invention is not limited to those embodiments and that any of known constructions may be employed insofar as the effects of the present invention are attained.

According to embodiments of the present invention, as set forth above, it is possible to provide a rotary disk storage device wherein an eddy-current magnet is disposed near a rotary disk recording medium to generate an eddy current and wherein an actuator suspension assembly can be restrained and released in a simple and positive manner within a small space. Further, by utilizing the same principle as above, it is possible to provide a method for restraining and releasing the actuator suspension assembly.

What is claimed is:

1. A rotary disk storage device comprising:
    a housing;
    a rotary disk recording medium having a recording area, at least a partial area of the recording medium being formed of an electrically conductive material;
    an actuator suspension assembly to which a head/slider is attached and which includes a voice coil motor, said actuator suspension assembly being adapted to operate in such a manner that said head/slider moves between a retracted position and said recording area centrally about a pivot shaft supported by said housing;
    an eddy-current magnet disposed in proximity to a surface of the area of said rotary disk recording medium which area is formed of the electrically conductive material, said eddy-current magnet having a magnetic pole opposed to a surface of said rotary disk recording medium;
    a movable structure which releases said actuator suspension assembly restrained in said retracted position, said release being carried out by utilizing a force of an eddy current exerted on said eddy-current magnet which eddy current is produced in said rotary disk recording medium by said magnetic pole; and
    a biasing structure which, when said rotary disk recording medium is rotating at a predetermined number of revolutions or less or is at a standstill, imparts a biasing force to said latch member to turn the latch member to said restraint range, wherein said biasing structure includes a stator magnet of said voice coil motor.

2. The rotary disk storage device according to claim 1, further comprising a ramp, wherein said actuator suspension assembly retracts while positioning said head/slider to said ramp.

3. The rotary disk storage device according to claim 1, wherein said rotary disc recording medium has a landing area, and said actuator suspension assembly retracts said head/slider to said landing area.

4. The rotary disk storage device according to claim 1, wherein said movable structure is a latch member adapted to turn between a restraint range and a release range centrally about a latch shaft supported by said housing.

5. The rotary disk storage device according to claim 4, wherein the latch member has a latching portion for restraining said actuator suspension assembly.

6. The rotary disk storage device according to claim 4, wherein said latch member is adapted to turn between the restraint range and the release range so that said eddy-current magnet moves in parallel with the surface of said rotary disk recording medium.

7. The rotary disk storage device according to claim 4, wherein said latch member is adapted to turn between the restraint range and the release range so that said eddy-current magnet moves substantially perpendicularly to the surface of said rotary disk recording medium.

8. The rotary disk storage device according to claim 4, wherein said rotary disk recording medium has a non-recording area and, while said latch member turns between the restraint range and the release range, the magnetic pole of said eddy-current magnet is substantially opposed to a surface of said non-recording area.

9. The rotary disk storage device according to claim 8, wherein said non-recording area is located near an outer circumference of said rotary disk recording medium.

10. The rotary disk storage device according to claim 1, wherein said biasing structure includes said eddy-current magnet.

11. The rotary disk storage device according to claim 1, wherein said latch member has a magnetic portion or a magnet, and said biasing structure includes said magnetic portion or said magnet.

12. The rotary disk storage device according to claim 1, further comprising a spring for engagement with said latch member, wherein said biasing structure includes said spring.

13. The rotary disk storage device according to claim 1, wherein when in said retracted position, said movable structure attaches to said actuator assembly between said pivot shaft and an end opposite of said head/slider.

14. A rotary disk storage device comprising:
    means for accommodating components of the rotary disk storage device;
    means for storing data, said data storing means being supported rotatably by said components' accommodating means and having a recording area, at least a partial area of said data storing means being formed of an electrically conductive material;
    means for moving a head/slider between a retracted position and said recording area, said head/slider reading out data from said data storing means;
    means for restraining said head/slider moving means at said retracted position;
    means for supplying a magnetic flux to a surface of said data storing means, said magnetic flux supply means being disposed in proximity to the surface of the area of said data storing means which area is formed of the electrically conductive material; and means for releasing said head/slider moving means from the restrained state by utilizing a force of an eddy current exerted on said magnetic flux supply means which eddy current is produced in said data storing means by said magnetic flux upon rotation of the data storing means, said restraint releasing means holding said magnetic flux supply means, wherein said data storing means has a non-recording area, wherein said magnetic flux supply means is disposed in proximity to a surface of said non-recording area, and wherein said non-recording area is located near an outer circumference of said data storing means.

15. The rotary disk storage device according to claim 14, wherein said moving means operates centrally about a pivot shaft, and wherein when in said restrained state, said restraining means attaches to said moving means between said pivot shaft and an end opposite of said head/slider.

16. A method for releasing an actuator suspension assembly restrained at a retracted position in a rotary disk storage device, said rotary disk storage device having a rotary disk recording medium which includes at least a partial area formed of an electrically conductive material and an actuator suspension assembly which includes a head/slider, said method comprising:

rotating said rotary disk recording medium and allowing an eddy current to be produced in the rotary disk recording medium by a magnetic pole of an eddy-current magnet, said eddy-current magnet being disposed at a position close to the rotary disk recording medium in such a manner that the magnetic pole is opposed to a surface of said area formed of the electrically conductive material;

imparting a force based on said eddy current to said eddy-current magnet; and releasing said actuator suspension assembly from the restrained state by utilizing the force imparted to said eddy-current magnet, wherein the force based on said eddy current and imparted to said eddy-current magnet acts in a direction substantially perpendicular to a surface of said rotary disk recording medium.

17. The method according to claim 16, wherein the force based on said eddy current and imparted to said eddy-current magnet acts in a direction parallel to a surface of said rotary disk recording medium.

18. The method according to claim 16, wherein said actuator suspension assembly operates centrally about a pivot shaft, wherein said actuator suspension assembly is restrained in said retracted position by a moveable structure coupled with said eddy-current magnet, and wherein when in said retracted position, said moveable structure is attached to said actuator assembly between said pivot shaft and an end opposite of said head/slider.

19. The method according to claim 16, further comprising retracting said actuator suspension assembly using a biasing structure, wherein said biasing structure includes a stator magnet of a voice coil motor of said actuator suspension assembly.

20. The method according to claim 16, wherein said rotary disk recording medium has a non-recording area, wherein the magnetic pole of said eddy-current magnet is substantially opposed to a surface of said non-recording area, and wherein said non-recording area is located near an outer circumference of said rotary disk recording medium.

* * * * *